(12) United States Patent
Choung et al.

(10) Patent No.: US 10,823,090 B2
(45) Date of Patent: Nov. 3, 2020

(54) SYSTEM AND METHOD OF CONTROLLING ENGINE PROVIDED WITH DUAL CONTINUOUSLY VARIABLE VALVE DURATION DEVICE

(71) Applicants: HYUNDAI MOTOR COMPANY, Seoul (KR); KIA MOTORS CORPORATION, Seoul (KR)

(72) Inventors: Jin Woo Choung, Suwon-si (KR); Kiyoung Kwon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/511,900

(22) Filed: Jul. 15, 2019

(65) Prior Publication Data

US 2020/0173375 A1 Jun. 4, 2020

(30) Foreign Application Priority Data

Dec. 4, 2018 (KR) ........................ 10-2018-0154500

(51) Int. Cl.
*F02D 13/02* (2006.01)
*F02P 5/04* (2006.01)
(Continued)

(52) U.S. Cl.
CPC ......... *F02D 13/0207* (2013.01); *F01N 3/101* (2013.01); *F02P 5/045* (2013.01); *F02P 5/1502* (2013.01); *F01N 2340/02* (2013.01); *F01N 2900/1602* (2013.01); *F01N 2900/1626* (2013.01); *F02D 2200/0802* (2013.01); *F02D 2200/602* (2013.01)

(58) Field of Classification Search
CPC combination set(s) only.
See application file for complete search history.

(56) References Cited

U.S. PATENT DOCUMENTS 5,233,831 A * 8/1993 Hitomi ................ F02D 13/0249
60/284
7,716,919 B2 * 5/2010 Murase ............... F02D 13/0219
60/289

(Continued)

FOREIGN PATENT DOCUMENTS

KR 10-1619394 B1 5/2016

*Primary Examiner* — Binh Q Tran
(74) *Attorney, Agent, or Firm* — Brinks Gilson & Lione

(57) ABSTRACT

A system of controlling an engine includes: an engine including a combustion chamber, an intake valve, an ignition switch, and an exhaust valve; a dual continuously variable valve duration device to adjust an intake duration of the intake valve and an exhaust duration of the exhaust valve; and a controller for adjusting an ignition timing of the ignition switch, the intake duration, and the exhaust duration based on a driving condition of the vehicle. In particular, until the temperature of the exhaust gas reaches a predetermined temperature after the engine starts, the controller sets the ignition timing to an ignition timing within a predetermined ignition timing range, sets the intake duration of the intake valve to an intake duration within a predetermined intake duration range, and increases the exhaust duration of the exhaust valve to a limit exhaust duration according to the set intake duration.

11 Claims, 12 Drawing Sheets

(51) Int. Cl.
*F01N 3/10* (2006.01)
*F02P 5/15* (2006.01)

(56) References Cited

U.S. PATENT DOCUMENTS

| | | | |
|---|---|---|---|
| 2013/0047958 A1* | 2/2013 | Yamakawa | F02D 41/006 123/406.44 |
| 2015/0114342 A1* | 4/2015 | Iwai | F02D 21/08 123/305 |
| 2015/0260111 A1* | 9/2015 | Maeda | F02P 5/04 123/295 |
| 2015/0337744 A1* | 11/2015 | Matsuda | F02D 41/0002 123/344 |

* cited by examiner

SYSTEM AND METHOD OF CONTROLLING ENGINE PROVIDED WITH DUAL CONTINUOUSLY VARIABLE VALVE DURATION DEVICE

CROSS-REFERENCE TO RELATED APPLICATION

This application claims priority to and the benefit of Korean Patent Application No. 10-2018-0154500, filed on Dec. 4, 2018, the entire contents of which are incorporated herein by reference.

FIELD

The present disclosure relates to a system and method of controlling engine provided with dual continuously variable valve duration device.

BACKGROUND

The statements in this section merely provide background information related to the present disclosure and may not constitute prior art.

Generally, an internal combustion engine generates a power by burning mixed fuel and air in a combustion chamber. When the air is sucked, the intake valves are actuated by driving a camshaft, and the air is sucked into the combustion chamber while the intake valve is opened. Further, by driving the camshaft, an exhaust valve is operated and the exhaust gas is discharged from the combustion chamber while the exhaust valve is opened.

In the engine, the optimum intake valve/exhaust valve operation varies according to the rotational speed of the engine. That is, an appropriate lift of the valves or valve opening/closing time depends on the rotational speed of the engine. In order to realize an appropriate valve operation in accordance with the rotational speed of the engine, a plurality of cams for driving the valves are designed, or a continuously variable valve lift (CVVL) device has been developed to provide different lifts according to the engine speed.

Further, continuous variable valve timing (CVVT) technology has been developed to control the valve opening and closing timings while valve opening and closing durations are fixed.

In recent years, a technique to control a valve duration that is an opening or closing period of a valve based on a driving condition of a vehicle has been applied to a vehicle.

In general, a vehicle is equipped with a catalytic converter to reduce the emissions contained in its exhaust gas. The exhaust gas discharged from the engine through the exhaust manifold is guided to the catalytic converter installed in the exhaust pipe and purified therein. The exhaust gas passes through the muffler to attenuate the noise, and is discharged to the atmosphere through the tail pipe. The catalytic converter described above purifies the emissions contained in the exhaust gas. A soot filter for collecting particulate matters (PM) contained in the exhaust gas may be mounted on the exhaust pipe.

The three way catalyst (TWC) is one type of the catalytic converter and reacts with hydrocarbon compounds, carbon monoxide, and nitrogen oxides (NOx), which are harmful components of exhaust gas, such that these harmful compounds are removed. Pt/Rh, Pd/Rh or Pt/Pd/Rh system is used for the three way catalyst mainly in gasoline vehicles.

In order for the three way catalyst to purify the effluent contained in the exhaust gas, the temperature of the three way catalyst should be higher than the activation temperature. We have discovered that when the temperature of the three way catalyst is low at the initial stage of starting the vehicle, the exhaust cannot be purified and is discharged to the outside of the vehicle. Thus, it is desired to increase the temperature of the exhaust gas when the temperature of the three way catalyst is low or to reduce the amount of the exhaust gas in the exhaust gas while the three way catalyst is warming up.

The above information disclosed in this Background section is only for enhancement of understanding of the background of the present disclosure and therefore it may contain information that does not form the prior art that is already known to a person of ordinary skill in the art.

SUMMARY

The present disclosure provides a system and method of controlling engine provided with dual continuously variable valve duration device for raising a temperature of exhaust gas or reducing emissions EM contained in the exhaust gas by adjusting an intake duration, an exhaust duration of the exhaust gas, and an ignition timing.

A system of controlling an engine according to an exemplary form of the present disclosure includes: an engine including a combustion chamber, an intake valve provided in the combustion chamber for selectively supplying air or a mixture of air and fuel to the combustion chamber, an ignition switch provided in the combustion chamber to ignite and burn the mixture, and an exhaust valve disposed in the combustion chamber to selectively discharge the exhaust gas in the combustion chamber to an outside of the combustion chamber, a dual continuously variable valve duration device provided to adjust an intake duration of the intake valve and an exhaust duration of the exhaust valve; and a controller for adjusting an ignition timing of the ignition switch, the intake duration and the exhaust duration based on a driving condition of the vehicle. In particular, until the temperature of the exhaust gas reaches at a predetermined temperature after the engine starts, the controller sets the ignition timing of the ignition switch to an ignition timing within a predetermined ignition timing range, sets the intake duration of the intake valve to an intake duration within a predetermined intake duration range, and increases the exhaust duration to a limit exhaust duration determined based on the intake duration set by the controller.

In one form, before adjusting the ignition timing, the intake duration and the exhaust duration, the controller determines an optimum ignition timing based on a target exhaust temperature of the exhaust gas and sets the ignition timing to be the optimum ignition timing, and the controller also increases the exhaust duration determined based on the target exhaust temperature and the optimum ignition timing.

After the temperature of the exhaust gas reaches at the predetermined temperature, the controller sets the ignition timing of the ignition switch to an ignition timing within the predetermined ignition timing range, sets the intake duration of the intake valve to an intake duration within the predetermined intake duration range, and increases the exhaust duration to the limit exhaust duration according to the set intake duration.

The controller, after the temperature of the exhaust gas reaches at the predetermined temperature, sets the ignition timing of the ignition switch to the optimum ignition timing for exhaust gas reduction, sets the intake duration of the intake valve to an intake duration within the predetermined intake duration range, and increases the exhaust duration of the exhaust valve to the optimum exhaust duration based on the set target exhaust temperature and the set intake duration.

Until the temperature of the exhaust gas reaches at the predetermined temperature, and when a drive (D) range or a reverse (R) range of a gear shift lever is detected or an accelerator pedal is depress, the controller sets the ignition timing to an ignition timing within the predetermined ignition timing range, sets the intake duration to an intake duration within the predetermined intake duration range, and increases the exhaust duration to the optimum exhaust duration according to the target exhaust temperature and the set intake duration.

The system may further include a three way catalyst for purifying hydrocarbons, carbon monoxide, and nitrogen oxides contained in the exhaust gas downstream of the engine.

In another form of the present disclosure, a method of controlling an engine provided with a dual continuously variable valve duration device is provided. The engine includes an intake valve, an ignition switch, and an exhaust valve, and the dual continuously variable valve duration device is provided to adjust an intake duration of the intake valve and an exhaust duration of the exhaust valve. In particular, the method of controlling the engine includes: setting, by a controller, an ignition timing of an ignition switch of the engine to an optimum ignition timing according to a target exhaust temperature of exhaust gas when the engine is started; setting, by the controller, the intake duration of the intake valve to an intake duration within a predetermined intake duration range; and increasing, by the controller, the exhaust duration of the exhaust valve to an optimum exhaust duration according to the target exhaust temperature and the set intake duration.

In another form, the method may further include: determining, by the controller, whether a temperature of the exhaust gas reaches a first set temperature; setting, by the controller, the ignition timing of an ignition switch to an ignition timing within a predetermined ignition timing range when the temperature of the exhaust gas reaches the first set temperature; setting, by the controller, the intake duration of the intake valve to an intake duration within the predetermined intake duration range; and increasing, by the controller, the exhaust duration to a limit exhaust duration according to the set intake duration.

The method according to an exemplary form of the present disclosure may further include: determining, by the controller, a location of a gear shift lever and an operation of an accelerator pedal; when the gear shift lever is in the D range or the R range, or when the accelerator pedal is depressed, setting, by the controller, the ignition timing of the ignition switch to an ignition timing within the predetermined ignition timing range; setting, by the controller, the intake duration of the intake valve to an intake duration within the predetermined intake duration range; and increasing, by the controller, the exhaust duration of the exhaust valve to the optimum exhaust duration according to the set target exhaust temperature and the set intake duration.

In other form, the method may further include: when the gear shift lever is not detected in the D range or the R range and the accelerator pedal is not depressed, determining, by the controller, whether the temperature of the exhaust gas is equal to or higher than a second set temperature; when the temperature of the exhaust gas is equal to or higher than the second set temperature, setting, by the controller, the ignition timing of the ignition switch to an ignition timing within the predetermined ignition timing range; setting, by the controller, the intake duration of the intake valve to an intake duration within the predetermined intake duration range; and increasing, by the controller, the exhaust duration of the exhaust valve to the optimum exhaust duration according to the set target exhaust temperature and the set intake duration.

According to an exemplary form of the present disclosure, a temperature of exhaust gas can be raised by adjusting an intake duration, an exhaust duration of the exhaust gas, and an ignition timing. In this case, the three way catalyst located downstream of the engine can be heated quickly to reach the activation temperature. Thus, the amount of emissions can be reduced by reducing the warm-up time of the three way catalyst.

In addition, by adjusting the intake duration, the exhaust duration and the ignition timing of the engine, the temperature of the exhaust gas can be raised and the amount of the exhaust gas contained in the exhaust gas can be reduced. Thus, the warm-up time of the three way catalyst can be shortened and the amount of emission can be reduced.

In addition, the amount of emissions contained in the exhaust gas can be reduced by adjusting the intake duration, the exhaust duration and the ignition timing of the engine. By reducing the amount of emissions entering the three way catalyst while the three way catalyst is not warmed up, the amount of emissions exiting the vehicle can be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
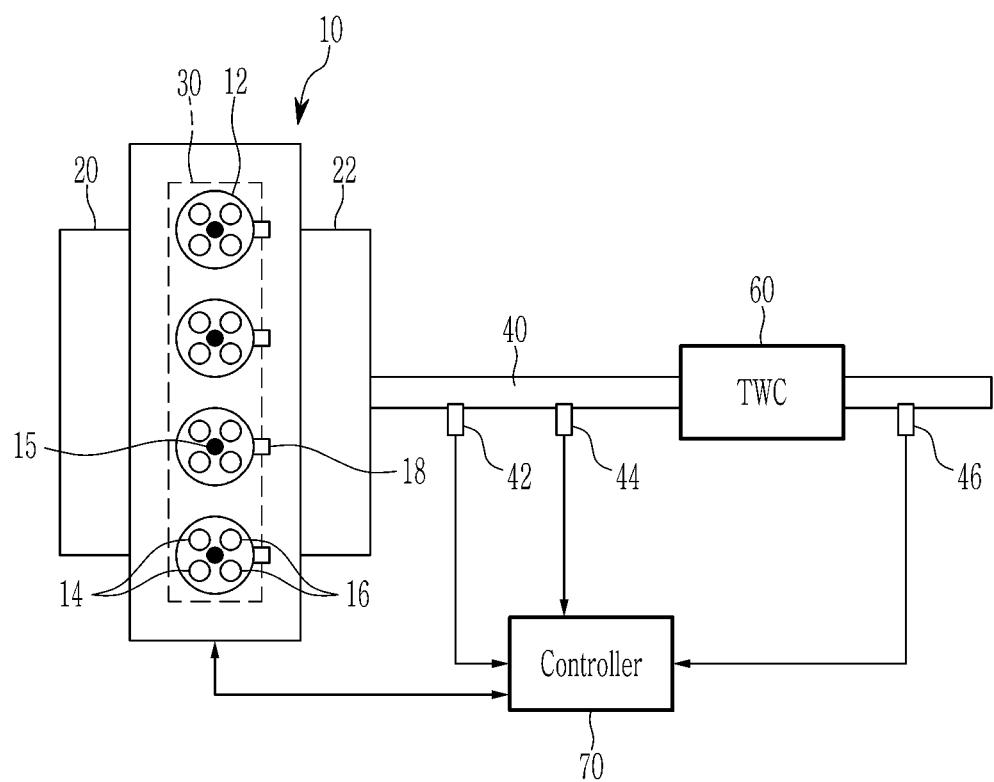
FIG. 1 is a configuration diagram of a system of controlling an engine according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

The terminology used herein is for the purpose of describing particular forms only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle," "vehicular," "car," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller, as described in detail below.

Furthermore, the controller of the present disclosure may be embodied as non-transitory computer readable media containing executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Hereinafter, exemplary forms of the present disclosure will be described in detail with reference to the accompanying drawings.

FIG. 1 is a configuration diagram of a system of controlling an engine according to an exemplary form of the present disclosure.

As shown in FIG. 1, a system of controlling an engine includes an engine 10, a dual continuously variable valve duration (CVVD) apparatus 30, an exhaust pipe 40, a three way catalyst 60, and a controller 70.

The engine 10 burns air-fuel mixture in which fuel and air are mixed so as to convert chemical energy into mechanical energy. The engine 10 includes a combustion chamber 12, an intake valve 14, an ignition plug 15, an exhaust valve 16, an injector 18, an intake manifold 20, and an exhaust manifold 22.

The combustion chamber 12 is connected to the intake manifold 20 to receive an air or the air/fuel mixture therein. An intake port is formed at the combustion chamber 12 and is equipped with the intake valve 14. The intake valve 14 is operated by rotation of a camshaft connected to a crankshaft to open or close the intake port. When the intake valve 14 opens the intake port, the air or the air/fuel mixture in the intake manifold 20 flows into the combustion chamber 12 through the intake port. When the intake valve 14 closes the intake port, on the contrary, the air or the air/fuel mixture in the intake manifold 20 does not flow into the combustion chamber 12. In addition, the combustion chamber 12 is connected to the exhaust manifold 22 so that the exhaust gas generated in the combustion process is collected in the exhaust manifold 22 and flows out to the exhaust pipe 40. An exhaust port is formed at the combustion chamber 12 and is equipped with the exhaust valve 16. The exhaust valve 16 is also operated by the rotation of the camshaft connected to the crankshaft to open or close the exhaust port. When the exhaust valve 16 opens the exhaust port, the exhaust gas in the combustion chamber 12 flows to the exhaust manifold 22 through the exhaust port. When the exhaust valve 16 closes the exhaust port, on the contrary, the exhaust gas in the combustion chamber 12 does not flow to the exhaust manifold 22.

Depending on types of the engine, the combustion chamber 12 may be equipped with the injector 18 to inject the fuel into the combustion chamber 12 (e.g., in case of a gasoline direct injection engine). In addition, depending on the types of the engine, the ignition switch 15 may be provided at a top of the combustion chamber 12 to ignite the air/fuel mixture in the combustion chamber 12 (e.g., in case of a gasoline engine).

The dual CVVD apparatus 30 is mounted at an upper portion of the engine 10 and adjusts a duration of the intake valve 14 and a duration of the exhaust valve 16. The dual CVVD apparatus 30 is constructed by incorporating an intake CVVD apparatus for variably controlling the duration of the intake valve 14 and an exhaust CVVD apparatus for variably controlling the duration of the exhaust valve 16. Various CVVD apparatus known so far, such as a CVVD apparatus disclosed in Korean Patent No. 1619394, can be used as the dual CVVD apparatus 30, and the entire contents of Korean Patent No. 1619394 are incorporated herein by reference. Also, in addition to the CVVD apparatus disclosed in Korean Patent No. 1619394, various CVVD apparatuses known so far can be used, and it is to be understood that the CVVD apparatus according to the forms of the present disclosure is not limited to the CVVD apparatus disclosed in Korean Patent No. 1619394.

Here, the duration of the intake valve 14 is referred to as an 'intake duration'. The intake duration is defined as a duration from when the intake valve 14 is open to when the intake valve 14 is closed. In addition, a timing at which the intake valve 14 is open is referred to as an intake valve open (IVO) timing, and a timing at which the intake valve 14 is closed is referred to as an intake valve close (IVC) timing. Therefore, the intake duration is the duration from the IVO timing to the IVC timing.

Here, the duration of the exhaust valve 16 is referred to as an 'exhaust duration'. The exhaust duration is defined as a duration from when the exhaust valve 16 is open to when the exhaust valve 16 is closed. In addition, a timing at which the exhaust valve 16 is open is referred to as an exhaust valve open (EVO) timing, and a timing at which the exhaust valve 16 is closed is referred to as an exhaust valve close (EVC) timing. Therefore, the exhaust duration is the duration from the EVO timing to the EVC timing.

The exhaust pipe 40 is connected to the exhaust manifold 22 to discharge the exhaust gas to an outside of a vehicle. Various catalytic converters are mounted on the exhaust pipe 40 to remove emission (EM) contained in the exhaust gas. For convenience of explanation, it is exemplified that the warm-up catalytic converter 60 including the TWC is mounted on the exhaust pipe 40, but it is to be understood that the catalytic converter mounted on the exhaust pipe 40 is not limited to the warm-up catalytic converter 60 including the TWC.

The three way converter 60 is disposed on the exhaust pipe 40 through which the exhaust gas discharged from the engine 10 flows, and harmful materials including CO, HC, and NOx contained in the exhaust gas are converted into harmless components by an oxidation-reaction reaction in the TWC. Since the three way converter is well known to a person of an ordinary skill in the art, a detailed description thereof will be omitted.

The exhaust pipe 40 is equipped with a plurality of sensors 42, 44, and 46 for detecting a combustion state and a function of the three way catalyst 60.

The temperature sensor 42 is mounted on the exhaust pipe 40 at an upstream of the three way catalyst 60, detects a temperature of the exhaust gas at the upstream of the three way catalyst 60, and transmits a signal corresponding thereto to the controller 70.

The first oxygen sensor 44 is mounted on the exhaust pipe 40 at the upstream of the three way catalyst 60, detects $O_2$ concentration in the exhaust gas at the upstream of the three way catalyst 60, and transmits a signal corresponding thereto to the controller 70.

The second oxygen sensor 46 is mounted on the exhaust pipe 40 at the downstream of the three way catalyst 60, detects $O_2$ concentration in the exhaust gas at the downstream of the three way catalyst 60, and transmits a signal corresponding thereto to the controller 70.

Figure 2:
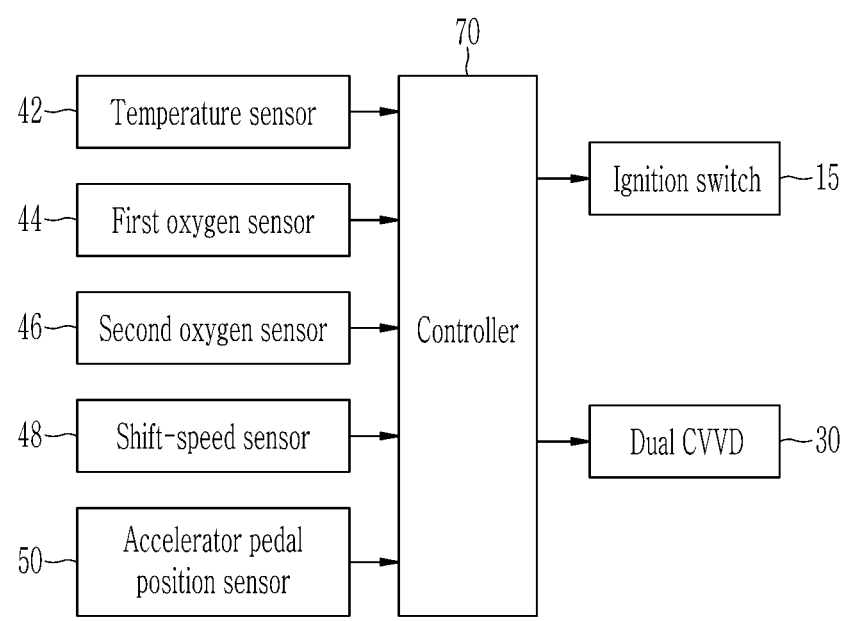
FIG. 2 is a block diagram of a system of controlling an engine according to an exemplary form of the present disclosure.

In addition to the sensors 42, 44, and 46 described herein, a system for controlling the engine may further includes various sensors. For example, an additional temperature sensor may be mounted on the exhaust pipe 40 at the downstream of the three way catalyst 60 to detect the temperature of the exhaust gas at the downstream of the three way catalyst 60. In addition, as shown in FIG. 2, the system of controlling the engine may further include a shift-speed sensor 48 and an accelerator pedal position sensor 50. Further, the system of controlling the engine may further include an HC sensor or a CO2 sensor mounted on the exhaust pipe 40, and concentration of the EM contained in the exhaust gas can be detected via these sensors.

The controller 70 is electrically connected to the sensors 42, 44, 46, 48, and 50 to receive the signals corresponding to the detected values by the sensors 42, 44, 46, 48, and 50, and determines the combustion state, whether the three way catalyst 60 normally operates, and/or a driving condition of the vehicle based on the signals. The controller 70 controls at least one of an ignition timing of the ignition plug 15, the intake duration, and the exhaust duration based on the determination results. The controller 70 may be implemented with one or more processors executed by a predetermined program and the predetermined program may be programmed to perform each step of a method of controlling the engine according to the exemplary forms of the present disclosure.

Hereinafter, with reference to FIG. 2, inputs and outputs of the controller 70 in the system of controlling the engine according to the exemplary forms of the present disclosure will be described in more detail.

FIG. 2 is a block diagram of a system of controlling an engine according to an exemplary form of the present disclosure.

FIG. 2 is a simplified illustration of the inputs and the outputs of the controller 70 for implementing the system of the system of controlling the engine, and it is to be understood that the inputs and the outputs of the controller 70 is not limited to the exemplary form illustrated in FIG. 2.

As shown in FIG. 2, the controller 70 is electrically connected to the temperature sensor 42, the first and second oxygen sensors 44 and 46, the shift-speed sensor 48, and the accelerator pedal position sensor 50, and receives the signals corresponding to the detected values by the sensors 42, 44, 46, 48, and 50.

The temperature sensor 42 detects the temperature of the exhaust gas at the upstream of the three way catalyst 60 and transmits the signal corresponding thereto to the controller 70. The controller 70 predicts a bed temperature of the warm-up catalytic converter 60 based on the signal.

The first oxygen sensor 44 detects $O_2$ concentration in the exhaust gas at the upstream of the three way catalyst 60, and transmits a signal corresponding thereto to the controller 70, and the second oxygen sensor 46 detects $O_2$ concentration in the exhaust gas at the downstream of the three way catalyst 60, and transmits a signal corresponding thereto to the controller 70. The controller 70 determines whether or not the three way catalyst 60 is normally operating based on the signals of the first and second oxygen sensors 44 and 46 and controls the air-fuel ratio control of the engine 10.

The shift-speed sensor 48 detects the shift range in which the shift lever is located and transmits a signal to the controller 70. For example, the shift range may include a P range, an R range, an N range, a D range, and the like.

The accelerator pedal position sensor 50 detects a displacement of an accelerator pedal and transmits a signal corresponding thereto to the controller 70. For example, if a driver does not depress the accelerator pedal at all, the displacement of the accelerator pedal may be 0%, and if the driver fully depresses the accelerator pedal, the displacement of the accelerator pedal may be 100%. The displacement of the accelerator pedal indicates the driver's will to accelerate.

The controller 70 controls operation of at least one of the ignition plug 15 and the dual CVVD 30 based on the detected values by the sensors 42, 44, 46, 48, and 50. That is, the controller 70 controls the ignition timing of the ignition plug 15, the intake duration, and/or the exhaust duration.

Here, the influence of the ignition timing, the intake duration and the exhaust duration on the exhaust gas temperature will be described with reference to FIGS. 3 to 5 and FIG. 9.

Figure 3:
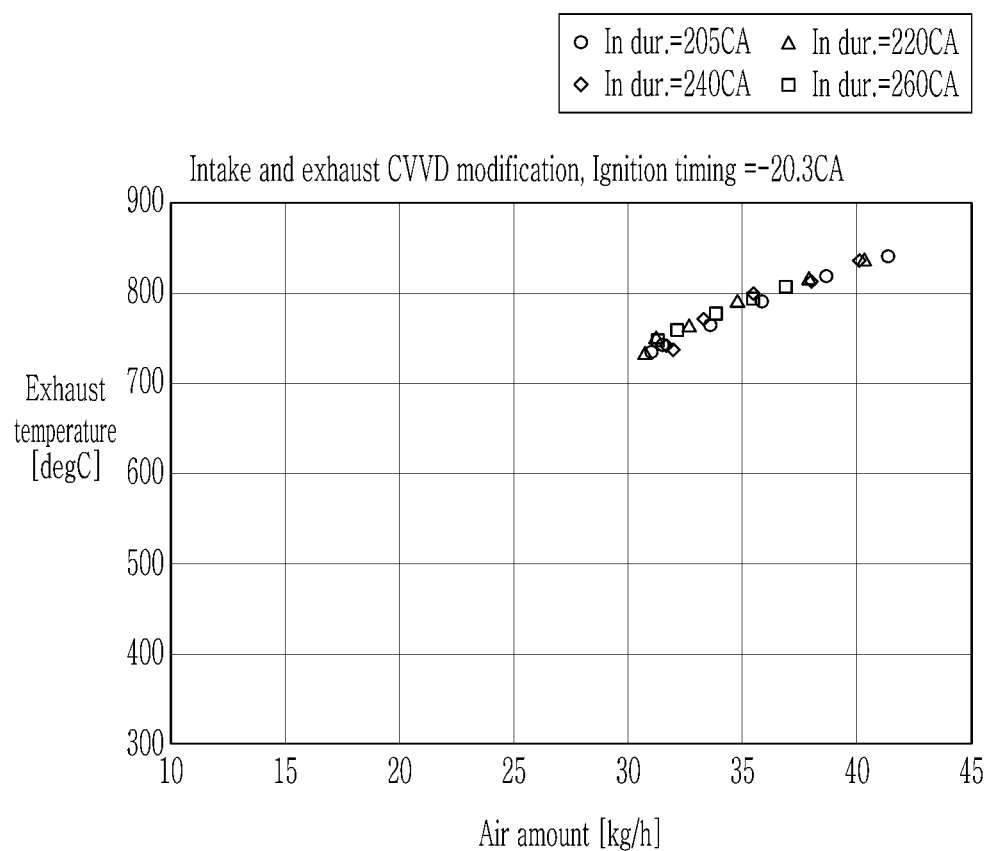
FIG. 3 is a graph showing the temperature of the exhaust gas when the intake duration is fixed and the exhaust duration is varied while the ignition timing is fixed to −20.3 CA.
Figure 4:
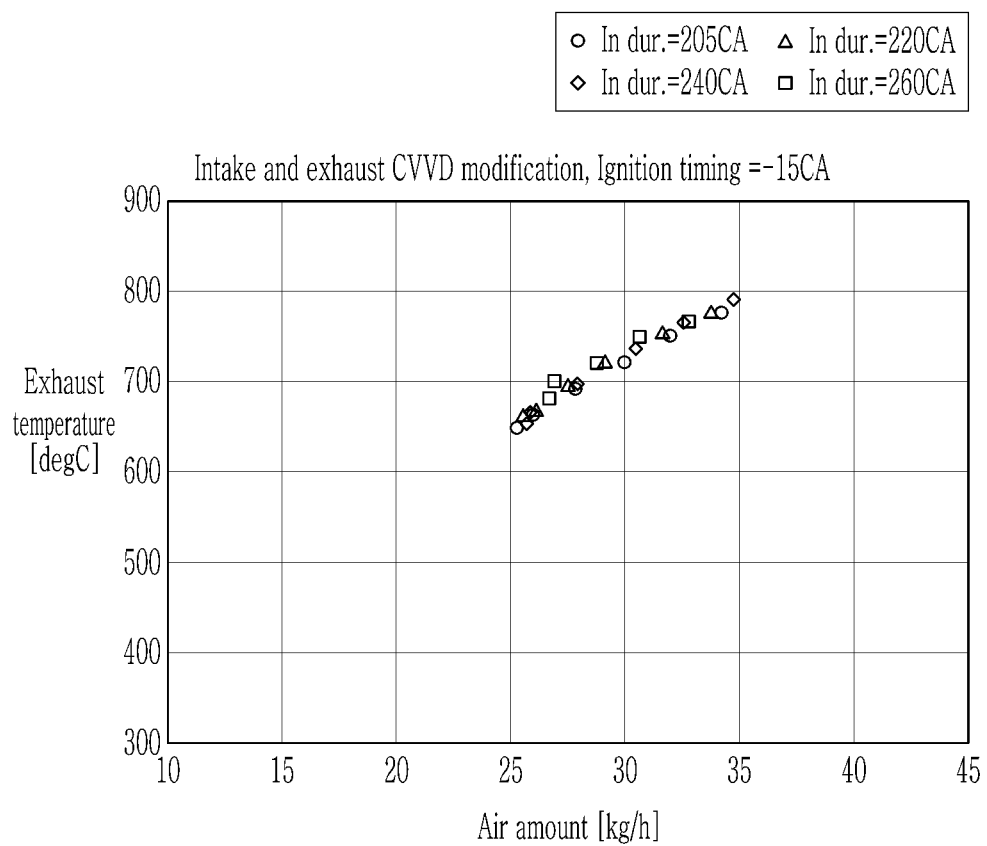
FIG. 4 is a graph showing the temperature of the exhaust gas when the intake duration is fixed and the exhaust duration is varied while the ignition timing is fixed to −15 CA.
Figure 5:
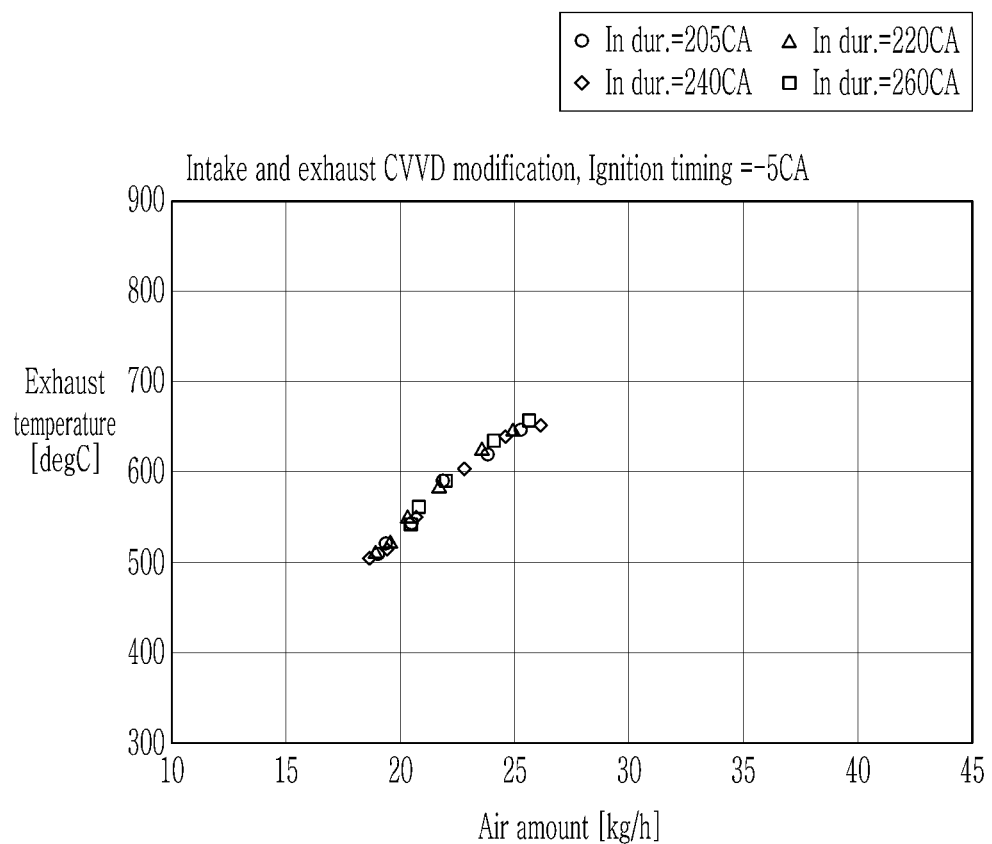
FIG. 5 is a graph showing the temperature of the exhaust gas when the intake duration is fixed and the exhaust duration is varied while the ignition timing is fixed to −5 CA.
Figure 9:
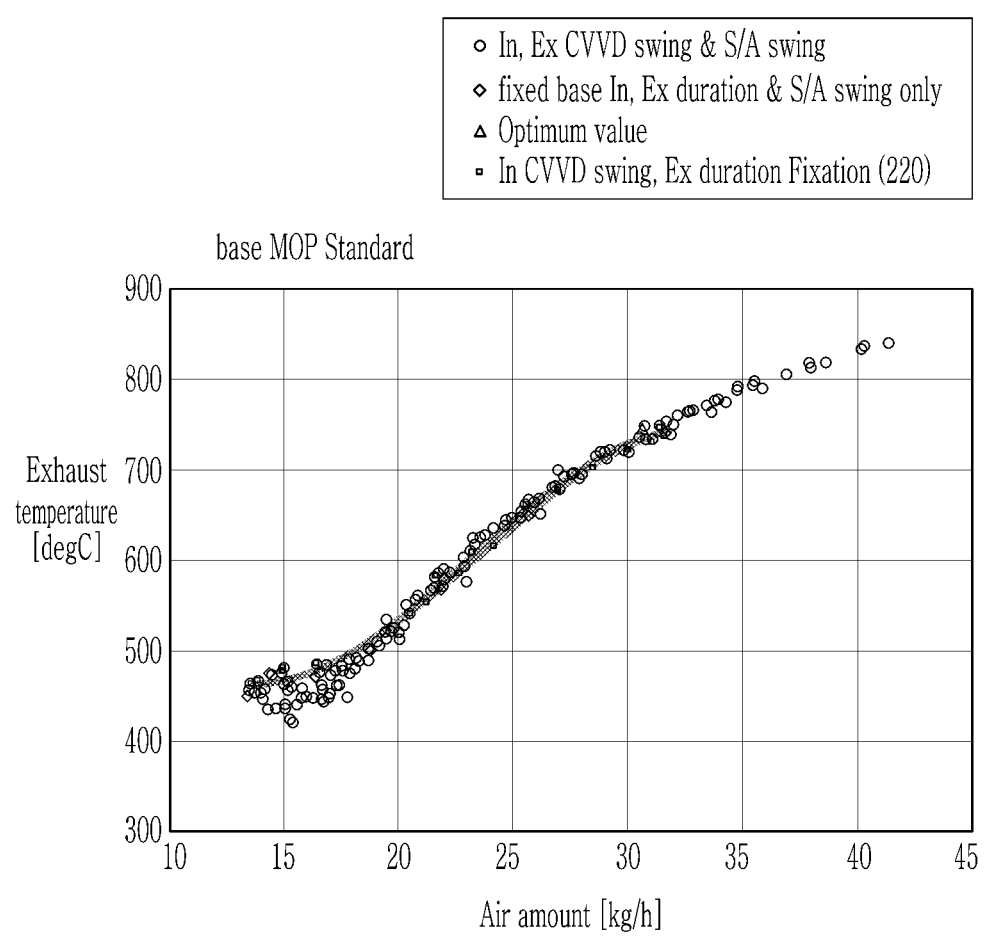
FIG. 9 is a graph showing the temperature of the exhaust gas when the intake duration is varied and when the exhaust duration is varied while the ignition timing is fixed.

FIG. 3 is a graph showing the temperature of the exhaust gas when the intake duration is fixed and the exhaust duration is varied while the ignition timing is fixed to −20.3 CA, FIG. 4 is a graph showing the temperature of the exhaust gas when the intake duration is fixed and the exhaust duration is varied while the ignition timing is fixed to −15 CA, and FIG. 5 is a graph showing the temperature of the exhaust gas when the intake duration is fixed and the exhaust duration is varied while the ignition timing is fixed to −5 CA. Further, FIG. 9 is a graph showing the temperature of the exhaust gas when the intake duration is varied and when the exhaust duration is varied while the ignition timing is fixed. In FIG. 3 to FIG. 5, the air amount is associated with the exhaust duration. That is, when the exhaust duration increases, the air amount also increases. Therefore, the air amount may be understood as the exhaust duration. Here, '−' sign means prior to 'top dead center (TDC)'. Also, in the ignition timing, '−' means retardation and '+' means advance angle.

As shown in FIG. 3, with the ignition timing fixed at −20.3 CA (crank angle), it can be seen that the temperature of the exhaust gas rises as the exhaust duration increases, regardless of the intake duration. Similarly, as shown in FIGS. 4 and 5, it can be seen that even when the ignition timing is fixed at −15 CA or −5 CA, the temperature of the exhaust gas rises as the exhaust duration increases, regardless of the intake duration. However, the temperature range of the exhaust gas varies depending on the ignition timing. For example, if the ignition timing is −20.3 CA, the temperature range of the exhaust gas is about 720° C. to 850° C. if the ignition timing is −15 CA, the temperature range of the exhaust gas is about 650° C. to 800° C., and if the ignition timing is −5 CA, the temperature range of the exhaust gas is about 500° C. to 650° C. Further, the variable range of the exhaust duration is determined in accordance with the intake duration. For example, if the intake duration is 205 CA or 220 CA, the exhaust duration can be increased to 315 CA, but if the intake duration is 240 CA or 260 CA, increasing the exhaust duration to 315 CA results in poor combustion stability. Therefore, the range in which the exhaust duration can be increased according to the intake duration is determined. Here, the maximum value of the exhaust duration according to the intake duration is defined as the limit exhaust duration.

On the other hand, it was found in the experiment that the influence of the intake duration on the exhaust gas temperature is small when the intake duration is varied while the ignition timing and the exhaust duration are fixed. These experimental results are shown collectively in FIG. 9.

As shown in FIG. 9, when the exhaust duration is fixed and only the intake duration is varied, the temperature of the exhaust gas does not rise much higher than the exhaust gas temperature when the intake duration and the exhaust duration are fixed. On the contrary, if the intake duration is fixed and only the exhaust duration is varied, the temperature of the exhaust gas can be increased by about 100° C. more than the exhaust gas temperature when the intake duration and the exhaust duration are fixed. Therefore, it is efficient to increase the exhaust gas temperature by fixing the intake duration and increasing the exhaust duration to the limit duration. In addition, from the viewpoint of temperature of the exhaust gas, it is efficient to retard the ignition timing as much as possible. However, the ignition timing can be set to a value within a predetermined ignition timing range in consideration of the combustion stability and the driving condition of the vehicle, and the intake duration can be set to a value within a predetermined intake duration range. For example, but not limited to, a predetermined ignition timing range for the exhaust gas temperature rise may be −20.3 CA to −15 CA, and a predetermined intake duration range may be 205 CA to 260 CA.

Hereinafter, the influence of the ignition timing, the intake duration and the exhaust duration on the amounts of nitrogen oxides and hydrocarbons will be described below with reference to FIGS. 6 to 8 and FIG. 10.

Figure 6:
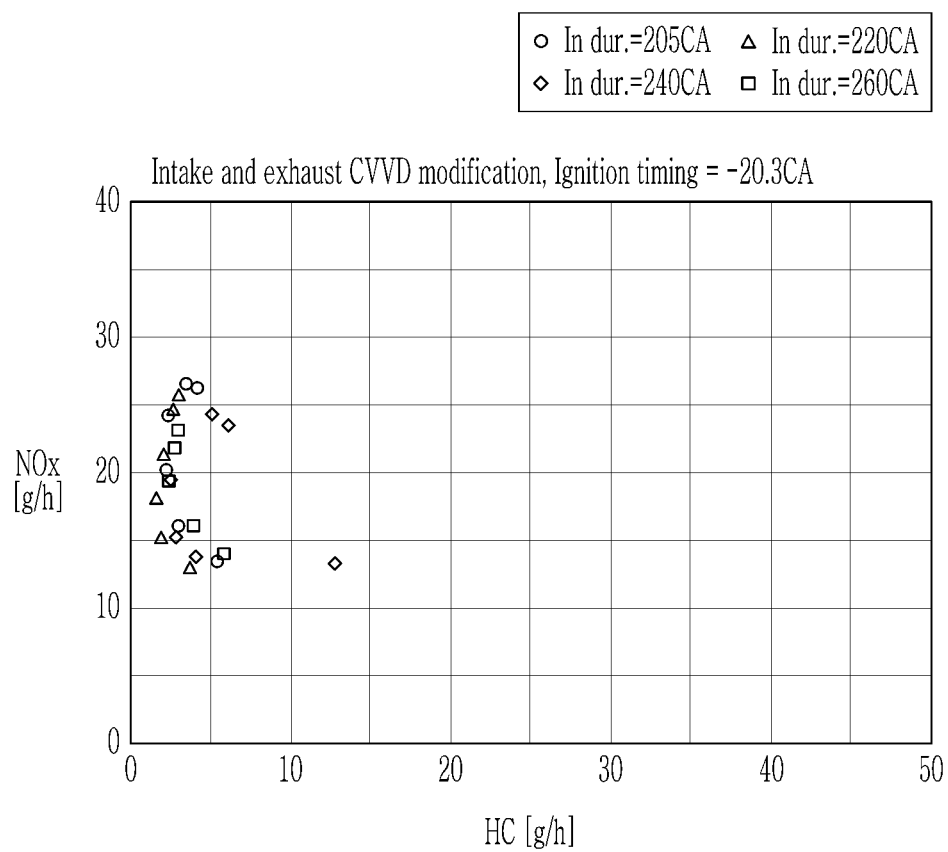
FIG. 6 is a graph showing an amount of nitrogen oxides and hydrocarbons when the intake duration is fixed and the exhaust duration is varied while the ignition timing is fixed to −20.3 CA.
Figure 7:
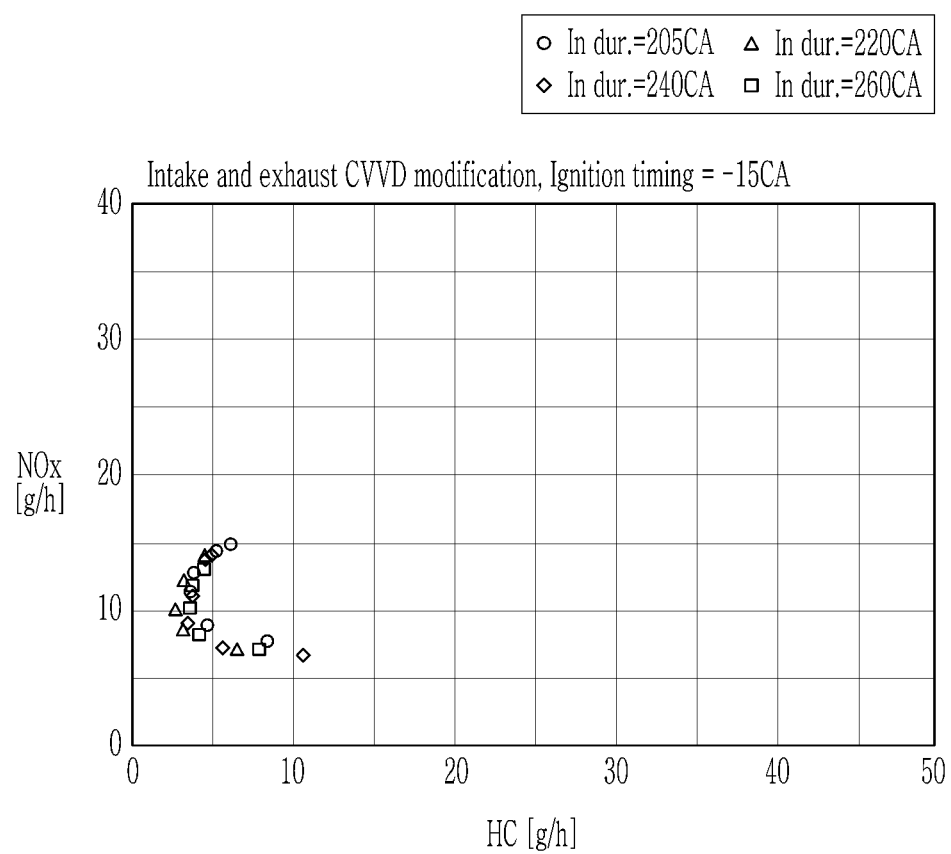
FIG. 7 is a graph showing an amount of nitrogen oxides and hydrocarbons when the intake duration is fixed and the exhaust duration is varied while the ignition timing is fixed to −15 CA.
Figure 8:
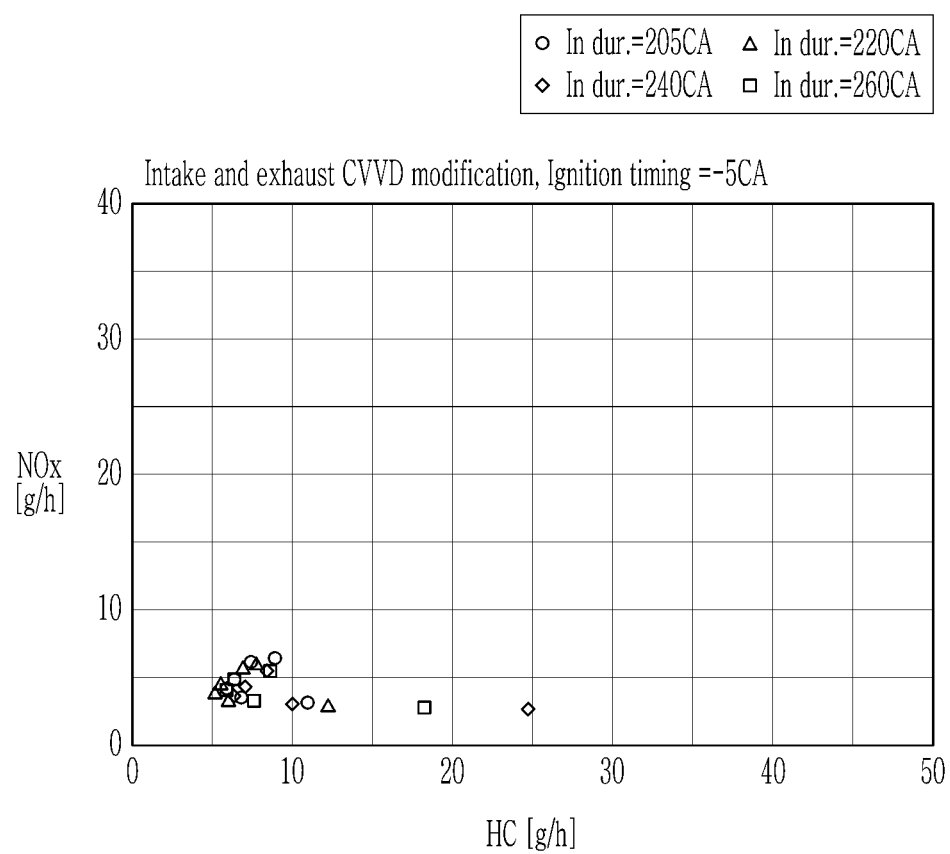
FIG. 8 is a graph showing an amount of nitrogen oxides and hydrocarbons when the intake duration is fixed and the exhaust duration is varied while the ignition timing is fixed to −5 CA.
Figure 10:
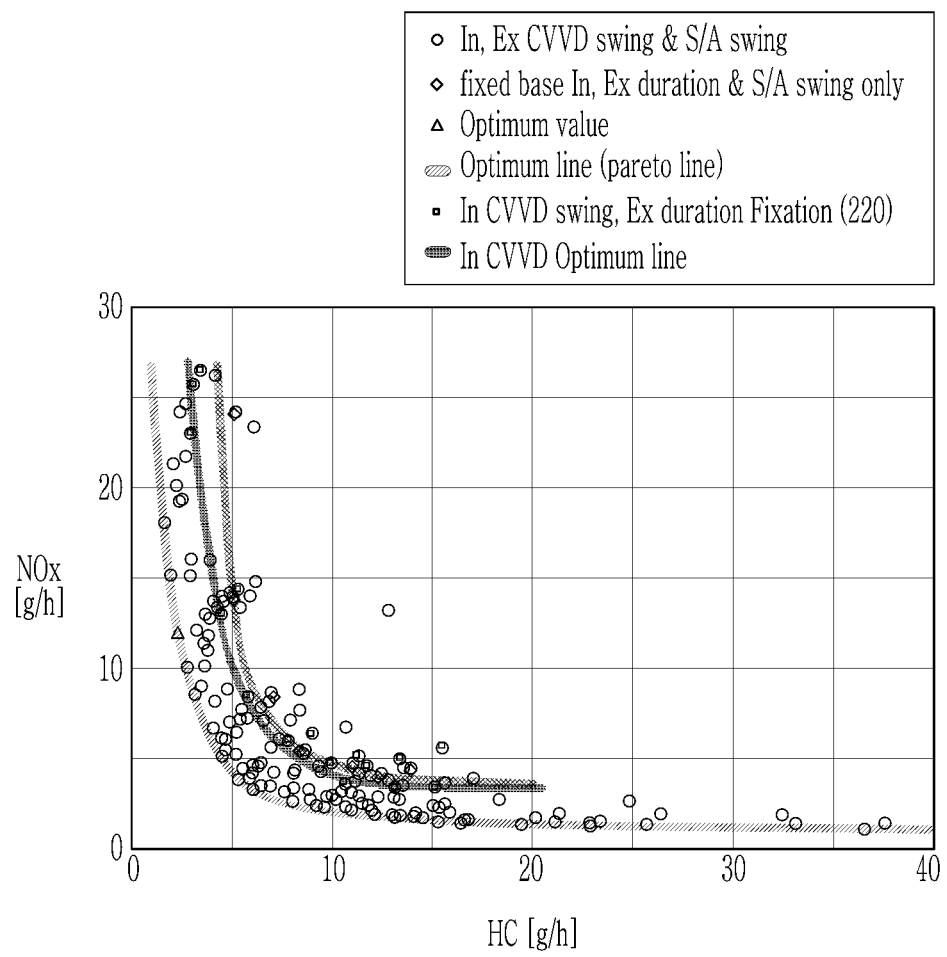
FIG. 10 is a graph showing an amount of nitrogen oxides and hydrocarbons when the intake duration is varied and when the exhaust duration is varied while the ignition timing is fixed.

FIG. 6 is a graph showing an amount of nitrogen oxides and hydrocarbons when the intake duration is fixed and the exhaust duration is varied while the ignition timing is fixed to −20.3 CA, FIG. 7 is a graph showing an amount of nitrogen oxides and hydrocarbons when the intake duration is fixed and the exhaust duration is varied while the ignition timing is fixed to −15 CA, and FIG. 8 is a graph showing an amount of nitrogen oxides and hydrocarbons when the intake duration is fixed and the exhaust duration is varied while the ignition timing is fixed to −5 CA. Further, FIG. 10 is a graph showing an amount of nitrogen oxides and hydrocarbons when the intake duration is varied and when the exhaust duration is varied while the ignition timing is fixed.

As shown in FIG. 6, it can be seen that the amount of nitrogen oxides and the amount of hydrocarbons vary with the variation of the exhaust duration, with the ignition timing fixed at −20.3 CA. It can also be seen that as the exhaust duration changes, the change in the amount of nitrogen oxides is greater than the change in the amount of hydrocarbons.

As shown in FIG. 7, it can be seen that the amount of nitrogen oxides and the amount of hydrocarbons vary with the variation of the exhaust duration under the condition that the ignition timing is fixed at −15 CA. It can also be seen that the change in the amount of nitrogen oxides and the change in the amount of hydrocarbons are similar as the exhaust duration changes. However, as the exhaust duration changes, the change in the amount of nitrogen oxides when the ignition timing is −15 CA is smaller than the change in the amount of nitrogen oxides when the ignition timing is −20.3 CA, but when the ignition timing is −15 CA, it can be seen that the change is larger than the change in the amount of hydrocarbon when the ignition timing is −20.3 CA.

As shown in FIG. 8, it can be seen that the amount of nitrogen oxides and the amount of hydrocarbons vary with the variation of the exhaust duration under the condition that the ignition timing is fixed at −5 CA. Also, it can be seen that as the exhaust duration changes, the change in the amount of nitrogen oxides is small but the change in the amount of hydrocarbons is large.

Referring to FIG. 6 to FIG. 8, when the ignition timing is −5 CA, if the intake duration is 205 CA to 220 CA, the exhaust duration is 281 CA, which is the minimum amount of exhaust oxide (sum of the amount of nitrogen oxide and hydrocarbon), and if the intake duration is 240 CA to 260 CA, the minimum exhaust duration is 260 CA. When the ignition timing is −15 CA, if the intake duration is 205 CA to 220 CA, the exhaust duration is 281 CA to 315 CA to minimize the amount of the exhaust, and if the intake duration is 240 CA, And when the intake duration is 260 CA, the exhaust duration at which the amount of the exhaust is minimized is 281 CA. Furthermore, when the ignition timing is −20.3, if the intake duration is 205 CA to 220 CA, the exhaust duration is 281 CA to 315 CA, which is the minimum amount of exhaust oxide, and when the intake duration is 240 CA to 260 CA, the exhaust duration is 281 CA to 300 CA.

On the other hand, in the case where the intake duration is varied in a state where the ignition timing and the exhaust duration are fixed, the influence of the intake duration on the amounts of nitrogen oxides and hydrocarbons varies with the ignition timing and the intake duration, it has been found in experiments that the effect of the exhaust duration on the amount is smaller than that of the exhaust duration. These experimental results are shown collectively in FIG. 10.

As shown in FIG. 10, when the exhaust duration is fixed and only the intake duration is increased, the amount of nitrogen oxides and hydrocarbons (the middle thick curve) is smaller than the amount of nitrogen oxides and hydrocarbons (the right side thick curve) when the exhaust duration and the intake duration are fixed. However, it can be seen that the degree of decrease in the amount of nitrogen oxides and hydrocarbons due to the variation of the intake duration is small. In contrast, when the intake duration is fixed and only the exhaust duration is increased, the amount of nitrogen oxides and hydrocarbons (the left side thick curve) is smaller than the amount of nitrogen oxides and hydrocarbons (the right side thick curve) when the exhaust duration and the intake duration are fixed. In addition, it can be seen that the degree of decrease in the amount of nitrogen oxides and hydrocarbons due to the variation of the intake duration is large. On the other hand, as the intake duration is fixed and the exhaust duration is increased, the amount of nitrogen oxides decreases, but the amount of hydrocarbons decreases and then increases again. Therefore, in order to reduce the amount of nitrogen oxides, it is effective to reduce the retardation of the ignition timing as much as possible, to fix the intake duration, and to increase the exhaust duration. In order to reduce the amount of hydrocarbons, the exhaust duration should be determined according to the optimum ignition timing and the optimum intake duration in a state where the ignition timing and the intake duration are fixed to the optimum ignition timing and the optimum intake duration, respectively.

Figure 11A:
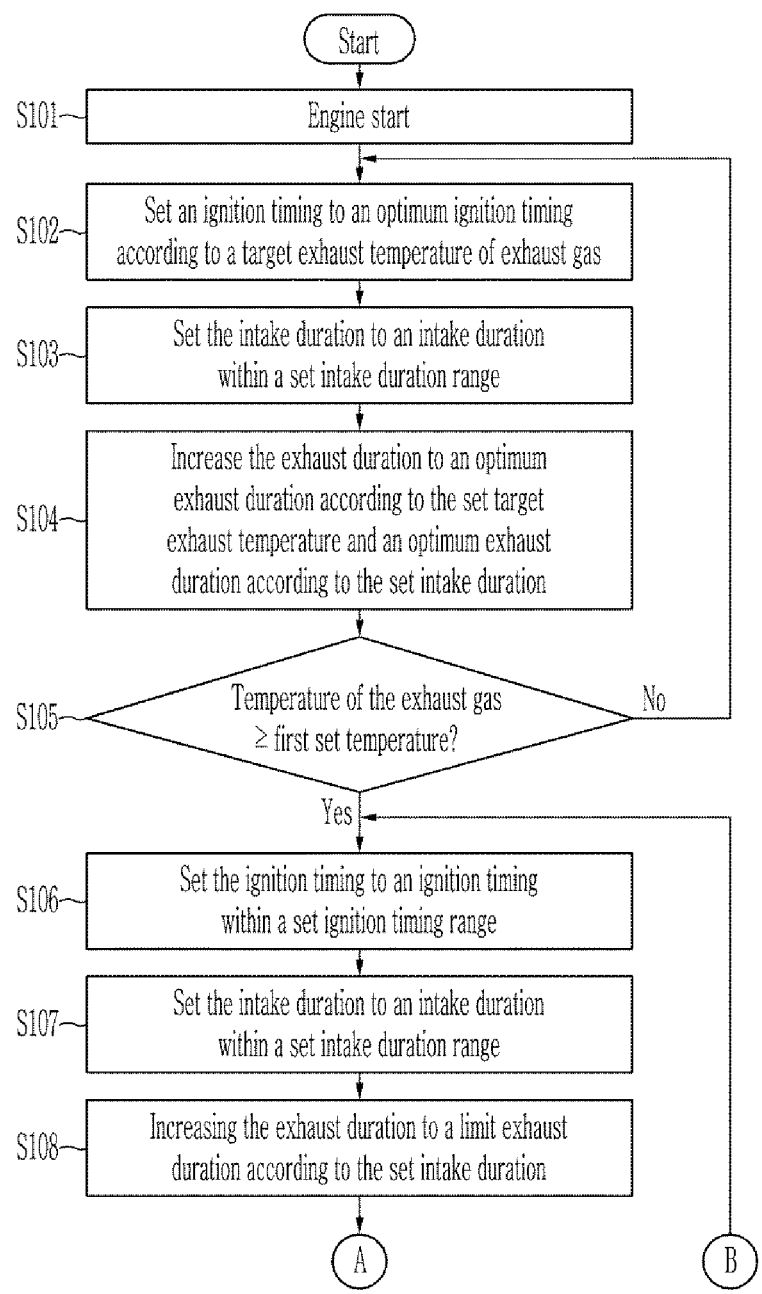
FIGS. 11A and 11B are flowcharts of a method of controlling an engine according to an exemplary form of the present disclosure.
Figure 11B:
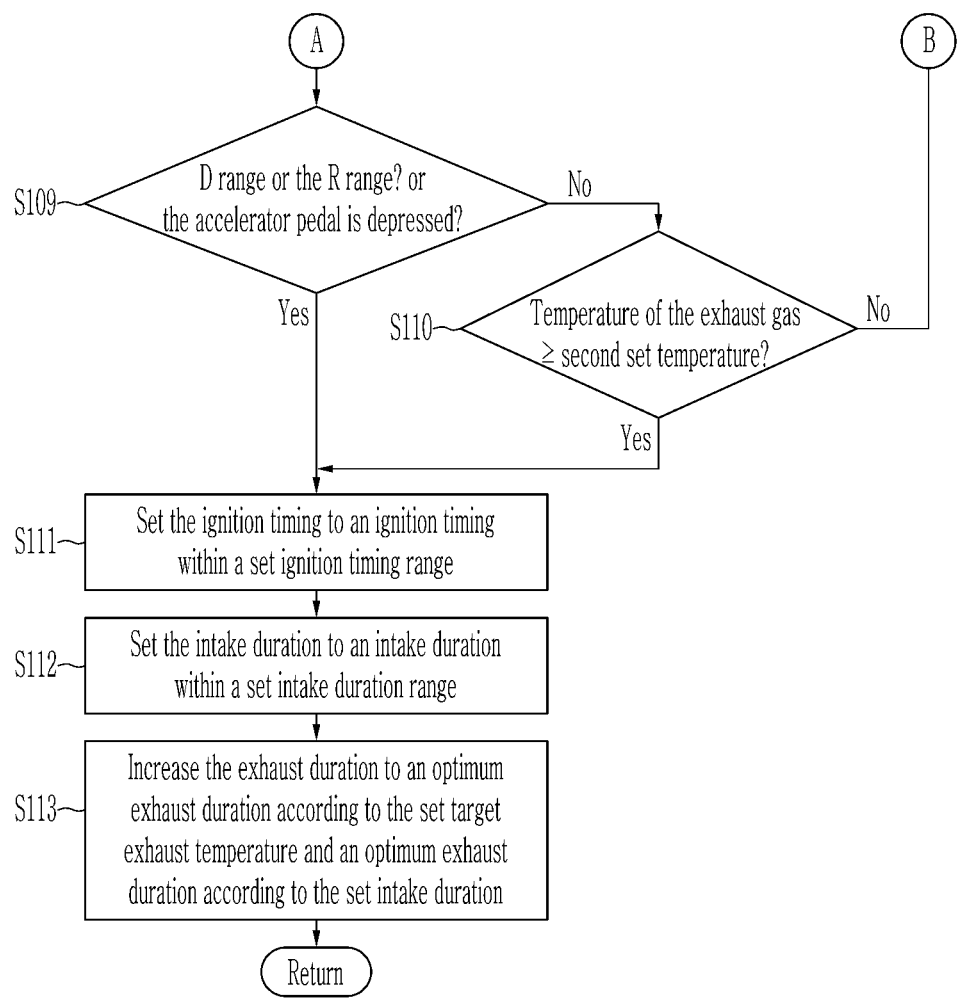

Hereinafter, the engine control method according to one form of the present disclosure will be described in detail with reference to FIGS. 11A and 11B. FIGS. 11A and 11B are flowcharts of a method of controlling an engine according to an exemplary form of the present disclosure.

Referring to FIGS. 11A and 11B, firstly, the engine starts S101.

Then, the controller 70 sets an ignition timing to an optimum ignition timing according to a target temperature of the exhaust gas S102. To increase the temperature of the exhaust gas to the target exhaust temperature, the ignition timing must be retarded or the exhaust duration must be increased. When the ignition timing is retarded, the temperature of the exhaust gas is increased but the amount of the exhaust gas may be increased. Therefore, it may be considered to adjust the ignition timing appropriately so as to reduce the amount of the exhaust, and then increase the exhaust duration (i.e., exhaust gas valve opening duration). In this regard, the controller 70 sets an optimal ignition timing that can minimize the amount of emissions based on the target exhaust temperature of the exhaust gas.

Then, the controller 70 sets the intake duration to an intake duration within a set intake duration range S103. Changes in the intake duration do not significantly affect the temperature of the exhaust gas and the amount of emissions. Therefore, it is desirable to set the intake duration to a value within the set duration of the intake duration in consideration of the combustion stability and the driving conditions of the vehicle. For example, the set intake duration range may be 205 CA to 260 CA.

Then, the controller 70 increases the exhaust duration to an optimum exhaust duration according to the set target exhaust temperature and an optimum exhaust duration according to the set intake duration S104. As the exhaust duration increases with the ignition timing and the intake duration fixed, the amount of nitrogen oxides decreases but the amount of hydrocarbons decreases. Therefore, it is desired to set the optimum exhaust duration at which the sum of the amount of nitrogen oxides and the amount of hydrocarbons becomes minimum.

Then, the controller 70 determines whether the temperature of the exhaust gas is equal to or higher than a first set temperature S105. Here, the first set temperature is the catalyst activation temperature, and the catalyst activation temperature means the temperature of the exhaust gas corresponding to the temperature at which the three way catalyst starts to be activated (for example, 200° C.).

The controller 70 sets the ignition timing to an ignition timing within a set ignition timing range when the temperature of the exhaust gas is equal to or higher than the catalyst activation temperature S106, sets the intake duration to an intake duration within a set intake duration range S107, and increases the exhaust duration to a limit exhaust duration according to the set intake duration S108.

If the temperature of the exhaust gas is not equal to or higher than the catalyst activation temperature, the controller 70 sets an ignition timing to an optimum ignition timing according to the target exhaust temperature of the exhaust gas S102.

Then, the controller 70 determines whether the D (Drive) range or the R (Reverse) range is selected or the accelerator pedal is depressed by changing the position of the shift lever S109. When the D range or the R range is selected or the accelerator pedal is depressed, the flow rate of the exhaust gas increases and the amount of the exhaust increases, so that the efficiency of the three way catalyst 60 may decrease.

When the temperature of the exhaust gas is equal to or higher than the catalyst activation temperature and the gear is detected as the D range or the R range or the accelerator pedal is depressed, the controller 70 sets the ignition timing to an ignition timing within a set ignition timing range S111, sets the intake duration to an intake duration within a set intake duration range S112, and increases the exhaust duration to an optimum exhaust duration according to the set target exhaust temperature and an optimum exhaust duration according to the set intake duration S113.

When the gear is not detected as the D range or the R range and the accelerator pedal is not depressed, the controller 70 determines whether the temperature of the exhaust gas is equal to or higher than a second set temperature S110. Here, the second set temperature refers to the temperature of the exhaust gas corresponding to the temperature (e.g., 300°

C. to 350° C.) at which the three way catalyst can purify the effluent with high purification efficiency.

If the temperature of the exhaust gas is equal to or higher than the second set temperature, since the temperature of the three way catalyst 60 is sufficiently raised, the controller 70 sets the ignition timing to an ignition timing within a set ignition timing range to minimize the amount of emissions S111, sets the intake duration to an intake duration within a set intake duration range S112, and increases the exhaust duration to an optimum exhaust duration according to the set target exhaust temperature and an optimum exhaust duration according to the set intake duration S113.

If the temperature of the exhaust gas is less than the second set temperature, the controller 70 sets the ignition timing to an ignition timing within a set ignition timing range S106.

According to an exemplary form of the present disclosure, a temperature of exhaust gas can be raised by adjusting an intake duration, an exhaust duration of the exhaust gas, and an ignition timing. In this case, the three way catalyst located downstream of the engine can be heated quickly to reach the activation temperature quickly. Thus, the amount of emissions can be reduced by reducing the warm-up time of the three way catalyst.

In addition, by adjusting the intake duration, the exhaust duration and the ignition timing of the engine, the temperature of the exhaust gas can be raised and the amount of the exhaust gas contained in the exhaust gas can be reduced. Thus, the warm-up time of the three way catalyst can be shortened and the amount of emission can be reduced.

In addition, the amount of emissions contained in the exhaust gas can be reduced by adjusting the intake duration, the exhaust duration and the ignition timing of the engine. By reducing the amount of emissions entering the three way catalyst while the three way catalyst is not warmed up, the amount of emissions exiting the vehicle can be reduced.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

| <Description of symbols> | |
|---|---|
| 10: engine | 12: combustion chamber |
| 14: intake valve | 15: ignition switch |
| 16: exhaust valve | 18: injector |
| 20: intake manifold | 22: exhaust manifold |
| 30: dual CVVD apparatus | 40: exhaust pipe |
| 42: temperature sensor | 44, 46: oxygen sensor |
| 48: shift-speed sensor | 50: accelerator pedal position sensor |
| 60: three way catalyst | 70: controller |

What is claimed is:

1. A system of controlling an engine provided with a dual continuously variable valve duration device, the system comprising:
the engine including:
a combustion chamber,
an intake valve configured to selectively supply air or a mixture of air and fuel to the combustion chamber,
an ignition switch provided in the combustion chamber, and
an exhaust valve configured to selectively discharge exhaust gas in the combustion chamber to an outside of the combustion chamber;
a dual continuously variable valve duration device configured to adjust an intake duration of the intake valve and an exhaust duration of the exhaust valve; and
a controller configured to adjust an ignition timing of the ignition switch, the intake duration, and the exhaust duration based on a driving condition of the vehicle, and
wherein until a temperature of the exhaust gas reaches at a predetermined temperature after the engine starts, the controller is configured to:
set the ignition timing of the ignition switch to an ignition timing within a predetermined ignition timing range,
set the intake duration of the intake valve to an intake duration within a predetermined intake duration range, and
increase the exhaust duration of the exhaust valve to a limit exhaust duration determined based on the intake duration set by the controller.

2. The system of claim 1, wherein before the controller adjusts the ignition timing, the intake duration and the exhaust duration, the controller is configured to determine an optimum ignition timing based on a target exhaust temperature of the exhaust gas and to set the ignition timing to be the optimum ignition timing, and the controller is configured to increase the exhaust duration to an optimum exhaust duration determined based on the target exhaust temperature and the optimum ignition timing.

3. The system of claim 2, wherein after the temperature of the exhaust gas reaches the predetermined temperature,
the controller sets the ignition timing of the ignition switch to an ignition timing within the predetermined ignition timing range,
sets the intake duration of the intake valve to an intake duration within the predetermined intake duration range, and
increases the exhaust duration to the limit exhaust duration based on the set intake duration.

4. The system of claim 3, wherein after the temperature of the exhaust gas reaches at the predetermined temperature,
the controller sets the ignition timing of the ignition switch to the optimum ignition timing for exhaust gas reduction,
sets the intake duration of the intake valve to an intake duration within the predetermined intake duration range, and
increases the exhaust duration of the exhaust valve to the optimum exhaust duration based on the target exhaust temperature and the set intake duration.

5. The system of claim 3, wherein until the temperature of the exhaust gas reaches at the predetermined temperature, when a drive (D) range or a reverse (R) range of a gear shift lever is detected or an accelerator pedal is depressed,
the controller sets the ignition timing to an ignition timing within the predetermined ignition timing range,
sets the intake duration of the intake valve to an intake duration within the predetermined intake duration range, and
increases the exhaust duration to the optimum exhaust duration based on the target exhaust temperature and the set intake duration.

6. The system of claim 1, further comprising: a three way catalyst configured to purify hydrocarbons, carbon monoxide, and nitrogen oxides contained in the exhaust gas downstream of the engine.

7. A method of controlling an engine provided with a dual continuously variable valve duration device, wherein the engine includes an intake valve, an ignition switch, and an exhaust valve, and the dual continuously variable valve duration device configured to adjust an intake duration of the intake valve and an exhaust duration of the exhaust valve, the method comprising:
- setting, by a controller, an ignition timing of an ignition switch of the engine to an optimum ignition timing based on a target exhaust temperature of exhaust gas when the engine is started;
- setting, by the controller, the intake duration of the intake valve to an intake duration within a predetermined intake duration range; and
- increasing, by the controller, the exhaust duration of the exhaust valve to an optimum exhaust duration based on the target exhaust temperature and the set intake duration.

8. The method of claim 7, further comprising:
- determining, by the controller, whether a temperature of the exhaust gas reaches a first set temperature;
- setting, by the controller, the ignition timing of an ignition switch to an ignition timing within a predetermined ignition timing range when the temperature of the exhaust gas reaches at the first set temperature;
- setting, by the controller, the intake duration of the intake valve to an intake duration within the predetermined intake duration range; and
- increasing, by the controller, the exhaust duration to a limit exhaust duration according to the set intake duration.

9. The method of claim 8, further comprising:
- determining, by the controller, a location of a gear shift lever and an operation of an accelerator pedal;
- when the gear shift lever is in a drive (D) range or a reverse (R) range, or the accelerator pedal is depressed,
- setting, by the controller, the ignition timing of the ignition switch to an ignition timing within the predetermined ignition timing range;
- setting, by the controller, the intake duration of the intake valve to an intake duration within the predetermined intake duration range; and
- increasing, by the controller, the exhaust duration of the exhaust valve to the optimum exhaust duration based on the target exhaust temperature and the set intake duration.

10. The method of claim 9, further comprising:
- when the gear shift lever is not detected in the D range or the R range, and the accelerator pedal is not depressed,
- determining, by the controller, whether the temperature of the exhaust gas is equal to or higher than a second set temperature;
- when the temperature of the exhaust gas is equal to or higher than the second set temperature,
- setting, by the controller, the ignition timing of the ignition switch to an ignition timing within the predetermined ignition timing range;
- setting, by the controller, the intake duration of the intake valve to an intake duration within the predetermined intake duration range; and
- increasing, by the controller, the exhaust duration of the exhaust valve to the optimum exhaust duration based on the set target exhaust temperature and the set intake duration.

11. A system of controlling an engine, wherein the engine includes a combustion chamber, an intake valve selectively supplying air or a mixture of air and fuel to the combustion chamber, an ignition switch arranged in the combustion chamber, an exhaust valve selectively discharging exhaust gas, and a dual continuously variable valve duration device to adjust an intake duration of the intake valve and an exhaust duration of the exhaust valve, the system comprising:
- a controller configured to adjust an ignition timing of the ignition switch, the intake duration, and the exhaust duration based on a driving condition of the vehicle, and
- wherein until a temperature of the exhaust gas reaches at a predetermined temperature after the engine starts, the controller is configured to:
  - set the ignition timing of the ignition switch to an ignition timing within a predetermined ignition timing range,
  - set the intake duration of the intake valve to an intake duration within a predetermined intake duration range, and
  - increase the exhaust duration of the exhaust valve to a limit exhaust duration determined based on the intake duration set by the controller.

* * * * *